United States Patent [19]

Feng

[11] Patent Number: 4,638,333

[45] Date of Patent: Jan. 20, 1987

[54] THERMAL PRINTING CIRCUIT

[75] Inventor: I-an Feng, San Jose, Calif.

[73] Assignee: Xerox Corporation, Stamford, Conn.

[21] Appl. No.: 791,483

[22] Filed: Oct. 25, 1985

[51] Int. Cl.[4] .............................................. G01D 15/10

[52] U.S. Cl. ................................................ 346/76 PH

[58] Field of Search ................... 346/76 PH; 400/120; 219/216 PH

[56] References Cited

U.S. PATENT DOCUMENTS

| | | | |
|---|---|---|---|
| 4,360,819 | 11/1982 | Saito et al. | 346/76 PH |
| 4,954,516 | 6/1984 | Moriguchi et al. | 346/76 PH |

*Primary Examiner*—Arthur G. Evans

*Attorney, Agent, or Firm*—Robert E. Cunha

[57] ABSTRACT

The described circuit and method controls a thermal printer for loading into a print register that segement of a line to be printed that contains the exact number of black pixels that can be printed by the associated power supply, regardless of the length of the segment. The printer then continues to print segments until the end of the line is reached. Finally, the last partial segment of the line is printed, containing the remainder of black pixels. This method will achieve the maximum possible printing speed from a given power supply.

4 Claims, 3 Drawing Figures

THERMAL PRINTING CIRCUIT

BACKGROUND OF THE INVENTION

This invention is a circuit for controlling the number of elements in thermal print heads that are activated at one time to prevent the overloading of the power supply, and more specifically, is a circuit for limiting the number of active elements to the exact number that can be loaded onto the power supply, regardless of the spacing of the data bits to be printed.

A thermal printer operates by activating a plurality of print elements, one element for each black pixel in the line. In the worst case, all pixels in the line will be black and all heating elements will have to be on simultaneously. A power supply large enough to handle this load therefore must be provided.

One way to reduce the size of the power supply is to divide up the line to be printed into segments and print the segments one at a time. This reduces the printing speed.

To reduce the size and cost of the required power supply, while maintaining some of the printing speed of a full line printer, Haruhiko Moriguchi et al, in U.S. Pat. Nos. 4,447,819 and 4,454,516, describe a system wherein the heating elements are divided into equal groups, and the black pixels in the current line are counted. If the number of black pixels in the line does not exceed the number of pixels in one group of heating elements, then the line is printed one segment at a time. To use a numerical example, assume there are 1600 bits, or pixels, per line, and that the line is divided into four segments. Then, the number of black pixels in the current line is determined. If it is less than or equal to 400, the entire line is printed. If it is more than 400, each segment is printed separately. In this case, the power supply can be designed to handle a maximum load of 400 pixels, instead of 1600, while the printing speed is still maintained at a reasonable rate because on a typical printed page, many lines will have fewer than 25% black pixels.

An improvement in speed can be accomplished by dividing the line into a number of segments, depending on the number of black pixels in the line. For example, if there are between 25% and 50% black pixels, the line can be divided into two groups while if there are more than 50% black pixels the line must be divided into four segments. Of course, there is a problem in this case if the pixels are not evenly spaced over the line.

SUMMARY OF THE INVENTION

This invention will increase the printing speed of this system over that of the prior art without requiring a larger power supply by counting black pixels in the data line as the pixels are received at the printer, and then printing that exact portion of the line that contains the maximum number of pixels that the power supply can support. For a numerical example, make the following assumptions. Assume that a typical printed line of text rarely exceeds 25% black pixels, and that the power supply has been designed to handle that number of heat generating printing elements. Also assume that the line has 1600 pixels, and that the printing circuit has been arranged so that any variable portion of the line can be printed. Then, as the data line is received, the black pixels are counted. If the number of black pixels is 400 or less, the entire line is printed. If the numer is between 401 and 800, the first 400 black pixels are loaded and that much of the line printed. Then the remainder of the line is printed. Note that there is no correlation between the size of the segment and the number of black pixels. The first 400 pixels may not occur in the first 25% of the line. However long the segment must be to contain the first 400 black pixels is the length of the first segment to be printed. The remaining segments are processed accordingly, and then the last portion is printed containing the remainder of the black pixels.

The speed advantage of this circuit is that by using a variable line segment length, the absolute minimum number of printing cycles is required.

DETAILED DESCRIPTION OF THE INVENTION

Figure 1:
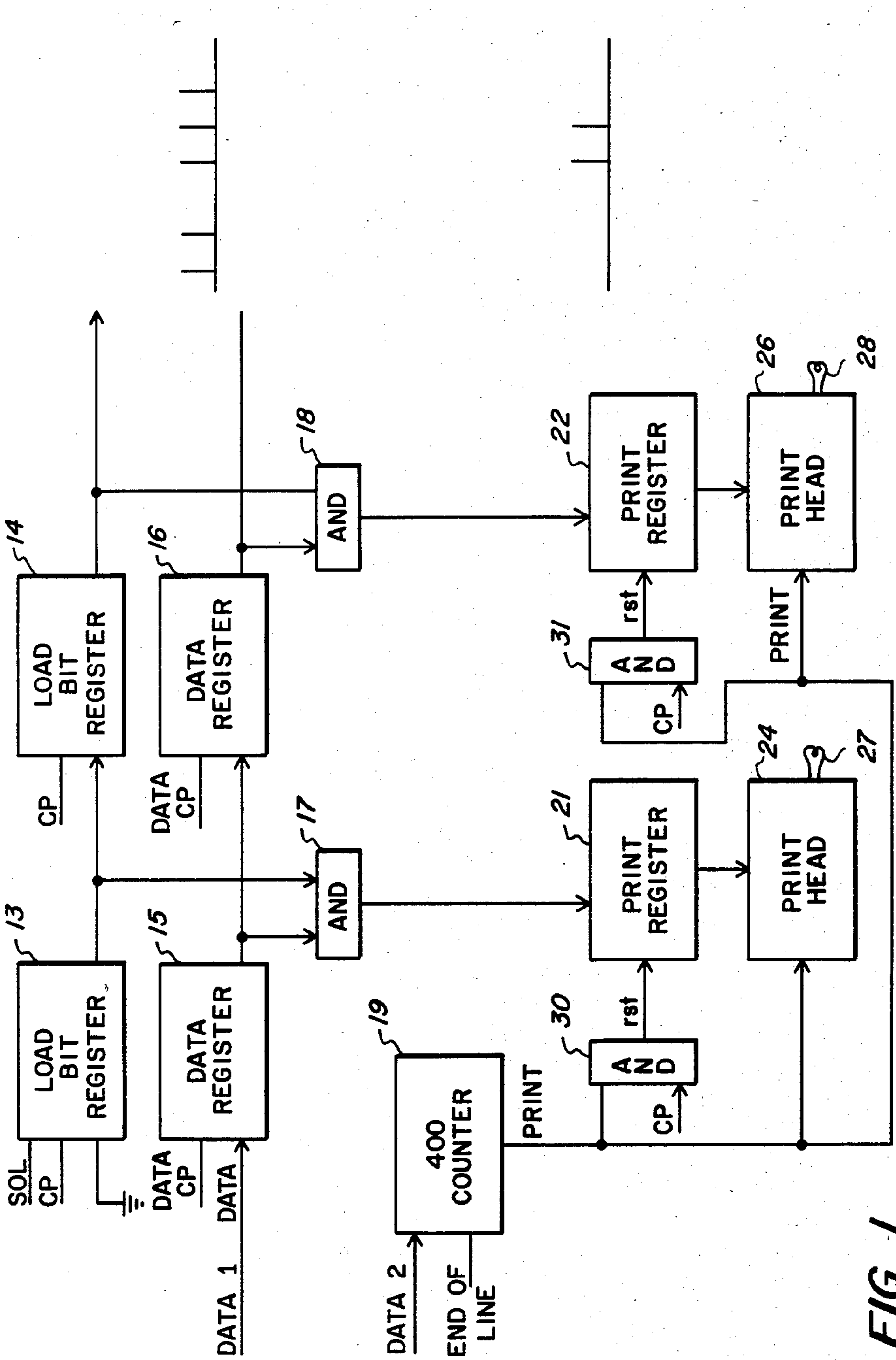
FIG. 1 is a schematic drawing of the circuit.

FIG. 1 is a schematic drawing of the circuit. Inputs to this circuit from the system in which it operates are a start-of-line pulse, and end-of-line pulse, serial data pulses, and a series of clock pulses that are synchronized with the data pulses at 1600 per line. Counter 19 is a modulo 400 counter which counts the number of black pixels in the current line. Each overflow is output as a print command. It is also reset by the end of line pulse, at which time it also generates a print output. The result is that the printer will print after each 400 black data pulses, whenever that may be, and also print at the end of the line, regardless of the number of black pixels that have been received since the last print pulse.

The remainder of the circuit has 400 channels, one for each printing element 27, 28. However, to reduce the size of the drawing, only the first two channels are shown. The components on the left side of the figure comprise channel 1, the components on the right comprise channel 2.

Elements 13 and 14 are the first two stages of the load bit register. Since the input to flip-flop 13 is grounded and since this signal is clocked through the entire register every line, all stages will below. However, at the beginning of each line the start-of-line (SOL) pulse sets the first stage high. Then, at the start of the second bit time, the high bit is clocked into the second stage 14, and the first bit stage goes low because of the grounded input.

Flip-flops 15 and 16 are the first two stages of the 1600 bit data register which holds one line of data while it is being printed. The data is shifted in serially from the left, or alternately, can be shifted into any portion of the register in parallel. When the entire line of data is shifted in, then the system will issue a start-of-line pulse to initiate the printing process. The data is actually loaded twice in this described embodiment, the first time to load the data register with a full line of data, the second time, one bit at a time as the bits are being loaded into the print register so that the 400 counter 19 can count the black pixels. These load steps can be done in parallel, provided that the data bit is in the data register 15, 16, before it is counted by the counter 19. For example, one byte can be loaded in parallel into the data register 15, 16 and then the same byte can be loaded serially into the counter 19.

Stages 21 and 22 are the first two stages of the print register. It's AND gate 17, 18 receives inputs from the corresponding stage of the load bit register 13, 14 and the data register 15, 16. The data bit from the data register is always present at the AND gate, but will be passed only when the load bit for that stage happens to be high. In that case the data bit will be loaded into the corresponding print register one at a time as well.

When the 400 counter 19 reaches a count of 400, the overflow will be sent to the print head which will print the corresponding bit held in the print register 21, 22, using heater elements shown schematically as heating elements 27, 28. The counter 19 will also output when it is reset by the system end-of-line pulse, which allows the print heads to print whatever fraction of a line remains in the print register 21, 22 at the end of the line. On the next clock pulse, the print pulse is ANDed with the clock pulse at AND gates 30, 31, the outputs of which reset the print registers back to all zeros. Thus, the previously printed line segment is erased and the circuit starts a new segment at the point in the line where the previous segment ended.

Figure 2:
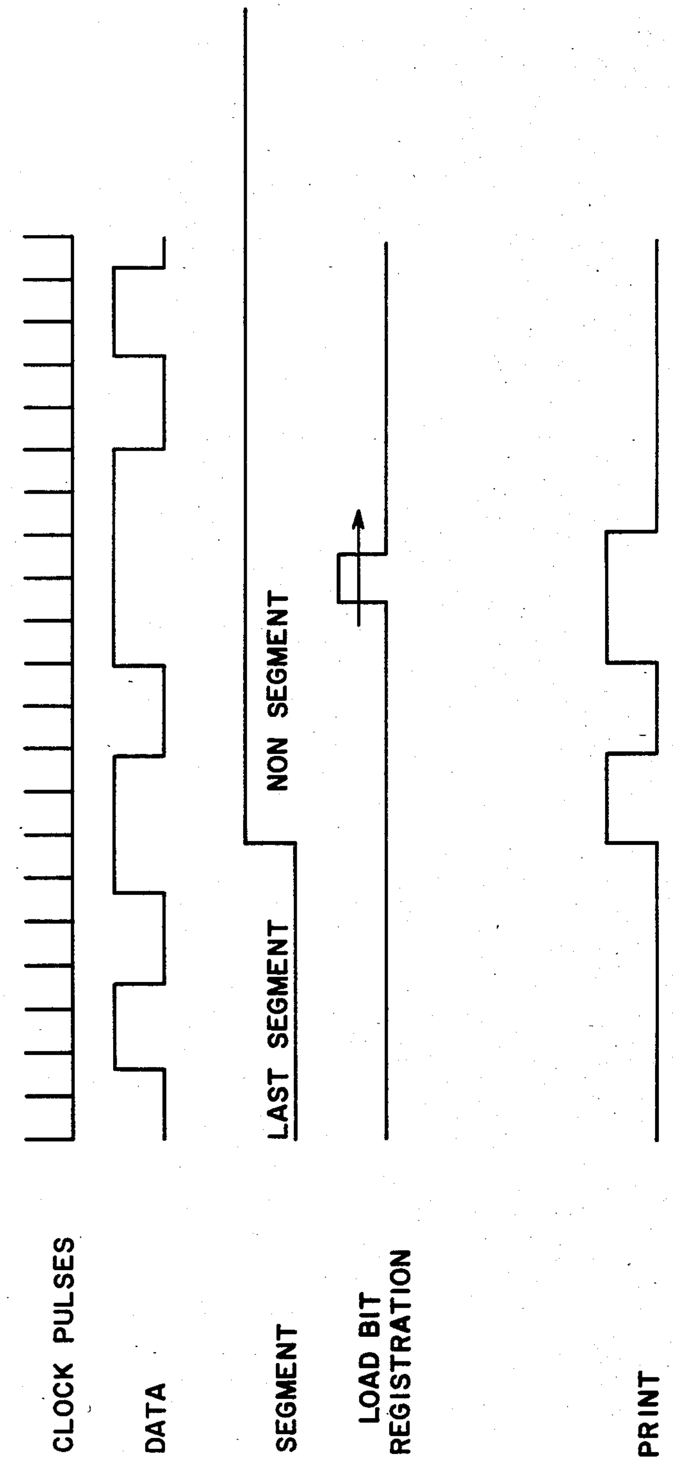
FIG. 2 is a set of timing diagrams.

The operation of the circuit is more easily explained by viewing the timing diagrams of FIG. 2 in relation to FIG. 1. The system first transmits 1600 bits of data to the data register 15, 16. The data is presented at the data input line of element 15, and is clocked through the entire register by clock pulses at the clock input lines labelled CP. For the remainder of the line operation, this data remains stable and is continuously presented to one input of the associated AND gate 21, 22. Twenty bits of this data are shown as the "Data" in FIG. 2.

Next, the system issues a start-of-line (SOL) pulse which is used to set the first bit of the load bit register high. The entire register is then clocked by the system clock 1600 times, resulting in the one high bit being passed through the entire line, as shown on the "load bit register" line of FIG. 2.

At each bit time the load bit pulse and the data are presented to AND gates 17, 18. The data is applied to the entire line of AND gates but only one register stage receives the high load bit. This AND gate therefore is the only one that can pass its data bit to the printer register 21, 26.

This clocking of data bits, one at a time, into the print register 21, 22 continues until the 400 counter 19 reaches a count of 400 black pixels. At this time the counter 19 overflows and allows the print heads 24, 26 to print. Also, on the next clock pulse, the clock pulse and the print pulse are ANDed to form a reset which sets all print register 21, 22 bits back to zero.

The circuit then resumes the reloading of the print register, but with the difference that the reloading starts, not at the beginning of the line as before, but at the point where the last load cycle ended. In FIG. 2 this is shown by the relationship between the "segment" line (which is not an actual waveshape) and the "print" line. Since the previously printed data bits of the last segments are erased from the print register before the new segment pixels are loaded, the print line shows only those black pixels that have been counted for the new segment. The circuit continues until the end of the line. At that point, the end-of-line (EOL) pulse sets the 400 counter 19, which is interpreted by the print register 21, 22 and print heads 24, 26 as a print command, resulting in the last fraction of the current line being printed regardless of the number of black pixels there may be in the line segment.

Figure 3:
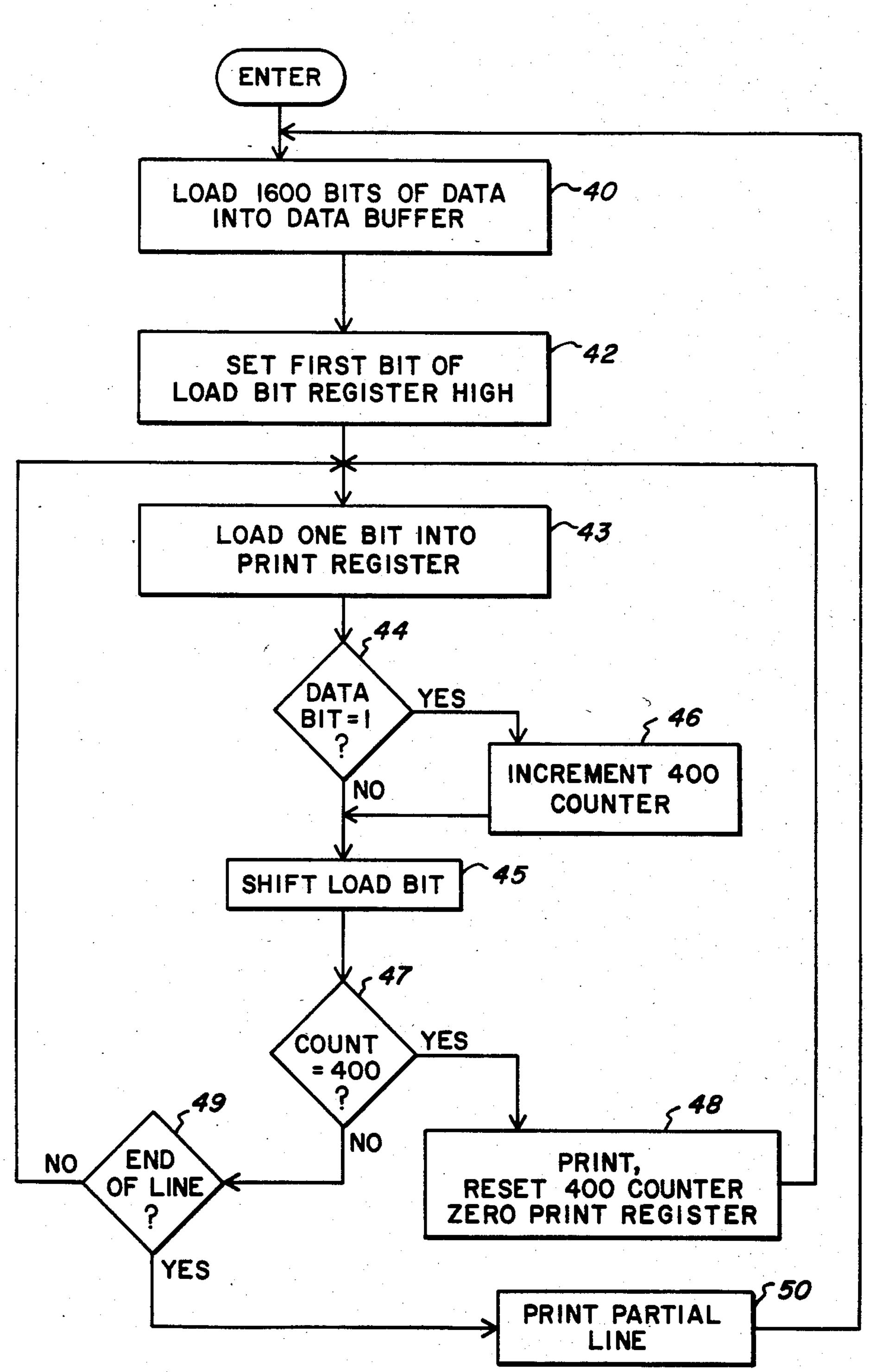
FIG. 3 is a flow chart of the circuit operation.

The flow chart of FIG. 3 describes the operation of this circuit. Prior to the print operation, in step 40, the system loads 1600 bits of data into the data register.

Next, in step 42, the circuit is initialized at the start of the line by setting the first bit of the load bit register high.

Then the iterative part of the process starts at step 43, at which time the black pixel, if there is one, is loaded into the print register stage, the 400 counter is incremented if the pixel was black at step 44, 46 and the load bit is moved one place to the right at step 45.

Next, the 400 counter is tested at step 47. If there have been 400 black pixels loaded into the print register, at step 48, they are printed, the 400 counter automatically overflows back to zero, and the print register is zeroed. The program then goes back to step 43. If, at step 47, the count was less than 400, if the end of the line has not been reached, step 49, the process goes back to step 43 for the next bit. If the end of the line has reached been reached, the last partial line segment is printed, step 50, and the process starts over at step 40.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A circuit for controlling a thermal printer to print a line of data by using thermal print elements comprising:

a modulo n counter for counting bits of one state in said line, said state being the one which requires its associated print element to be turned on, means responsive to said counter for dividing said line into a plurality of segments having variable numbers of bits of both sides each of which, except the last, contains n bits of said one state, and a last segment containing the remainder of said bits of said one state, and printing means responsive to said means for dividing for printing all of the bits of each segment in parallel and for completing the printing of one segment before starting the printing of the next segment.

2. The circuit of claim 1 wherein the bits of one said state are black.

3. The method of controlling a printer which uses thermal print elements to print a line in segments, said segments comprising variable numbers of bits of both states comprising the steps of:

dividing the number of bits of one state in the line by a predetermined number, n, to yield a number, m, and a remainder, r, and first printing m segments, one at a time, each containing n bits of said state, and second printing the last segment containing r bits of said state.

4. The method of claim 3 wherein the bits of said state are black.

* * * * *